Figure 1:
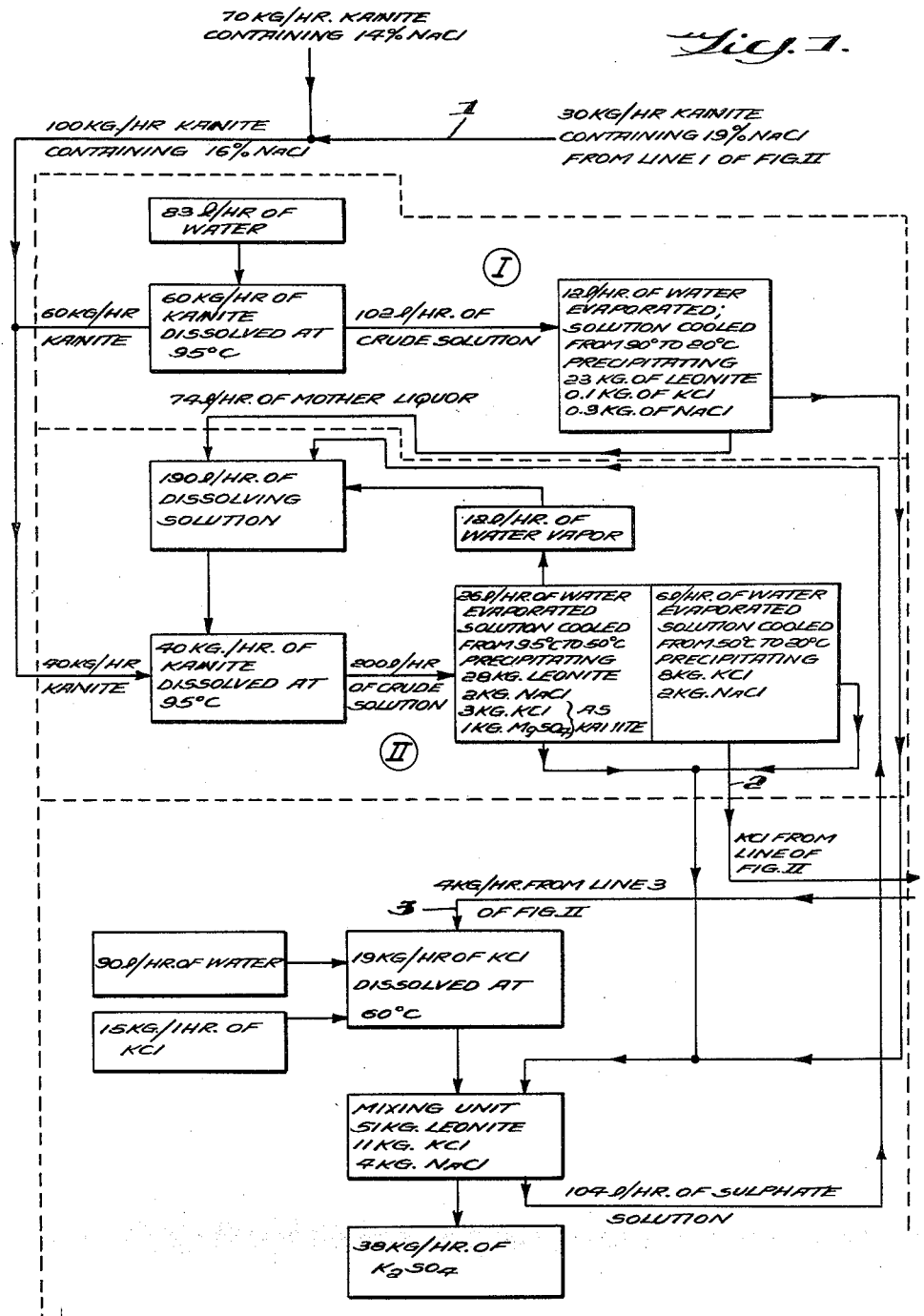

March 29, 1966
V. STEIN ETAL
PRODUCTION OF POTASSIUM SULFATE

Filed July 10, 1962

2 Sheets-Sheet 1

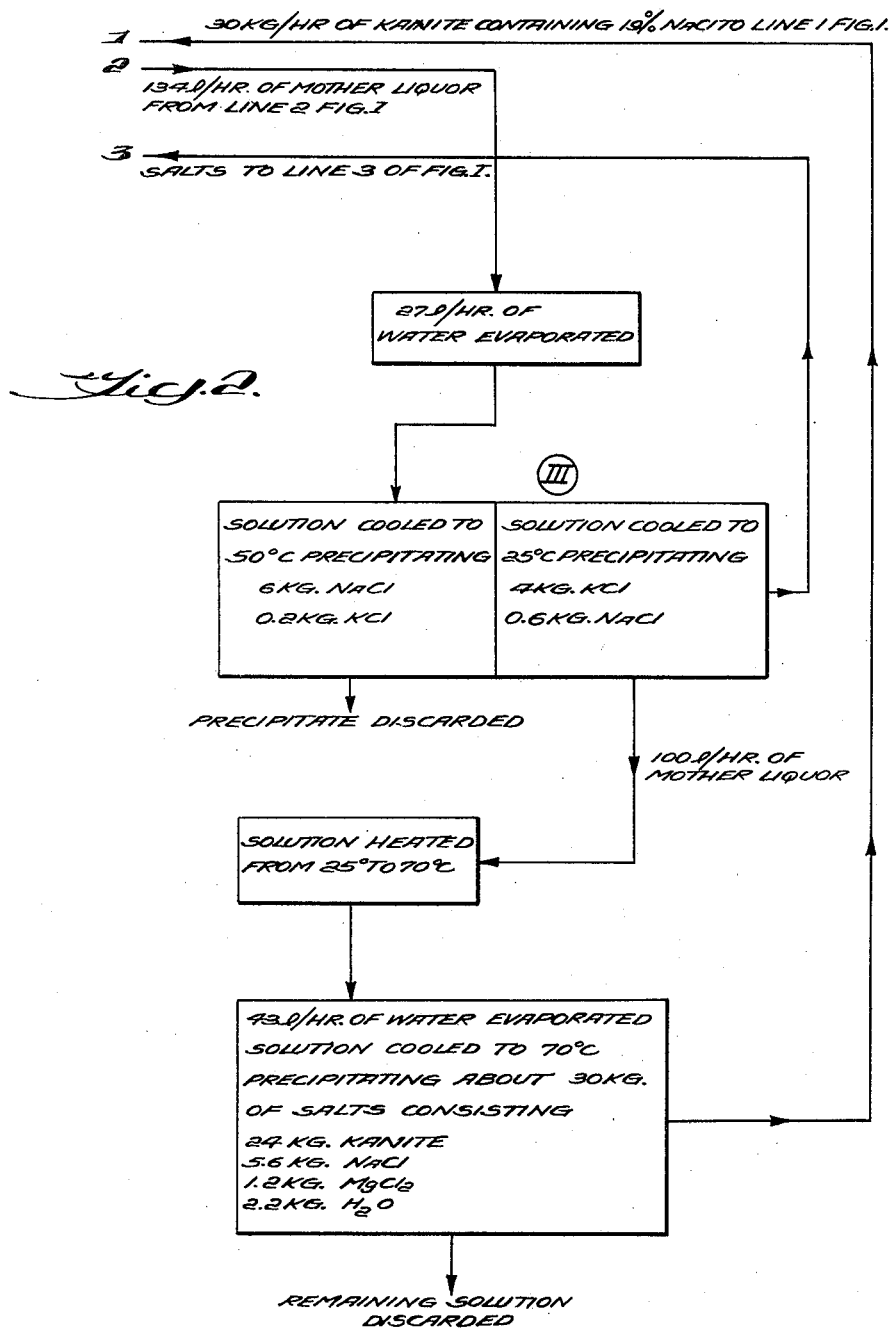

3,243,259
PRODUCTION OF POTASSIUM SULFATE
Vollprecht Stein and Eberhard Anschütz, Frankfurt am Main, Karl Ebner, Oberursel, Taunus, and Eduard Schnitzspahn, Frankfurt am Main, Germany, assignors to Metallgesellschaft Aktiengesellschaft, Frankfurt am Main, Germany
Filed July 10, 1962, Ser. No. 208,780
Claims priority, application Germany, July 15, 1961, M 49,696
8 Claims. (Cl. 23—121)

This invention relates to a process for producing potassium sulfate from kainite and more particularly to one employing evaporation and crystallization methods resulting in high yields of potassium sulfate.

It is known to convert potassium magnesium sulfate ($K_2SO_4 \cdot M_2SO_4$), recovered by converting kainite $$(K_2Mg(SO_4)_2 \cdot MgCl_2 \cdot 6H_2O)$$

with water, with potassium chloride to potassium sulfate. It is also known to produce potassium sulfate in several stages from kainite containing sodium chloride. In the first stage of this known process the potassium magnesium sulfate is recovered by dissolving kainite and then crystallizing, while in the second stage additional kainite is dissolved with the mother liquor of the first stage and part of the sulfate solution from the final potassium sulfate production stage. Potassium chloride and additional potassium magnesium sulfate are recovered by cooling in two crystallization steps. The potassium magnesium sulfate recovered in the first and second stages of the process is then reacted with potassium chloride, also recovered in the process, yielding potassium sulfate. This is disclosed in German Patent 1,086,220.

It has now been discovered that this known process can be essentially improved. Accordingly, a feature of the process of the invention comprises concentrating the kainite solution in the second stage of this known process by evaporating and cooling to a temperature of not essentially below 50° C. and then further concentrating the remaining solution and cooling to about 20° C. With the first cooling step the essentially hydrated potassium magnesium sulfate, preferably as leonite, is crystallized and in the second cooling essentially potassium chloride is crystallized. This potassium chloride is converted together with additional potassium chloride supplied from an external source in ways known per se to potassium sulfate.

According to another embodiment of the invention the mother liquor from the second stage of the process is concentrated by evaporation and then cooled to about 50° C. whereby sodium chloride essentially crystallizes out. It is then cooled further to about 25° C. so that potassium chloride is essentially crystallized out. This potassium chloride is likewise employed in the conversion of the potassium magnesium sulfate.

The mother liquor from these sodium chloride and potassium chloride crystallizations is further concentrated by evaporation and cooled to about 70° C., whereby essentially kainite is crystallized out. This kainite can be recycled and therefore can be added as a starting material in the first part of the process.

The sulfate solution from the final potassium sulfate production stage is expediently recycled in its entirety to the second stage of the process and employed there together with the mother liquor from the first stage of the process as a solvent for the kainite which is treated in the second stage of the process.

In a continuous operation according to the invention, kainite together with about 10–20% NaCl and the recycled kainite that is accumulated in the final extraction treatment is dissolved in water to form an aqueous solution. Potassium magnesium sulfate is then recovered by evaporating the water and cooling. The preceding procedure is hereinafter referred to as stage I of the process. Whether the potassium magnesium sulfate is precipitated as schönite ($K_2SO_4 \cdot MgSO_4 \cdot 6H_2O$) or leonite $$(K_2SO_4 \cdot MgSO_4 \cdot 4H_2O)$$

depends on the concentration and temperature conditions of the crystallization.

In the second stage of the process the mother liquor from this potassium magnesium sulfate crystallization of stage I is combined with the sulfate solution from the final potassium sulfate recovery resulting in a ratio of about two parts of potassium magnesium sulfate mother liquor to three parts of sulfate solution. This mixture of solutions is used for dissolving additional kainite. The raw solution obtained is now concentrated by evaporation and cooled in the two crystallization steps according to the invention described above. In the first crystallization step of this stage II essentially potassium magnesium sulfate is crystallized out, advantageously in the form of leonite, and essentially potassium chloride crystallized in the second step.

The potassium magnesium sulfate recovered in stages I and II is subsequently reacted with potassium chloride, in a manner known per se. The potassium chloride recovered in stage II and additional potassium chloride supplied from an external source outside the process are employed for this purpose. By mixing the potassium magnesium sulfate with this potassium chloride, potassium sulfate is obtained in addition to a sulfate solution. This sulfate solution, as previously described, is recycled to the kainite dissolving process of stage II.

The work up of the mother liquor accumulated from stage II is effected in a stage III by concentrating the solution by evaporation and by a two step crystallization. In the first crystallization steps of stage III the solution is cooled according to the invention, to a temperature of about 50° C. whereby essentially sodium chloride is recovered. In the second step of this stage, without further water evaporation, the solution is cooled below about 50° C. to about 25° C.; thus essentially potassium chloride is obtained. This potassium chloride is used in the final potassium magnesium sulfate conversion together with the potassium chloride from stage II of the process and that supplied from an external source outside the process.

The mother liquor from process stage III is further concentrated by evaporation, and kainite is crystallized out at a temperature of 70° C. This kainite is added to fresh kainite as a starting material for the process, and the remaining mother liquor is discarded.

In the various previously mentioned stages of this process involving evaporation and cooling it is possible, with similar results, to evaporate the solution first at higher temperatures and then additionally cool it to the desired crystallization temperature. It is also possible to carry out the process with simultaneous evaporation and crystallization in a vacuum crystallizer at the desired crystallization temperature whereby a special cooling is not necessary.

The process according to the invention has the advantage that the potassium chloride in the kainite is converted almost entirely to potassium sulfate since additional potassium chloride is introduced into the process from an external source.

The process exhibits an extraordinarily favorable balance among the reactants as in working up the mother liquor from stage II of the process first additional potassium chloride and finally kainite are recovered. The kainite can be recycled into the starting materials and consequently help to improve the potassium balance.

The invention is described more fully with reference to the accompanying drawings in which FIGURE 1 is a flow diagram of stages I and II and the final $K_2SO_4$ production stage of the process. FIGURE II is a flow diagram of stage III of the process. As shown, the integrated process steps of FIGURES I and II illustrate an example of how the process is operated continuously. The broken lines clarify each of the stages shown in FIGURE I.

In FIGURE I, in stage I of the process, 60 kg./hr. of kainite containing 16% NaCl is dissolved in 83 kg./hr. of water at about 95° C. in ways known per se. This kainite is taken from a mixture of 70 kg./hr. of kainite containing 14% NaCl and from 30 kg./hr. of recycled kainite from the work up of the mother liquor containing 19% NaCl in stage III of the process given in FIGURE II. This recycled kainite from stage III is carried to the first part of the process through line 1.

In stage I of the process 12 l./hr. of water are evaporated from the 102 l./hr. of crude solution. The solution is cooled to about 20° C., thus crystallizing 23 kg./hr. of leonite besides small amounts of NaCl and KCl. The remaining 74 l./hr. of mother liquor is mixed with the entire sulfate solution, 104 l./hr., from the final $K_2SO_4$ recovery stage with the addition of 12 l./hr. of condensate from stage II of the process. This solution is employed in addition to dissolve the remaining 40 kg./hr. of kainite resulting in 200 l./hr. of crude solution.

In the first step of the two step crystallization of stage II, 26 l./hr. of water are evaporated from the 200 l./hr. of crude solution. The solution is cooled to 50° C., thus crystallizing 28 kg./hr. of leonite, 2 kg./hr. NaCl, 3 kg./hr. KCl bound and 1 kg./hr. of $MgSO_4$. In this mixture the $MgSO_4$ bound with KCl is present as kainite.

In the second step of stage II, 8 kg./hr. KCl and 2 kg./hr. of NaCl are obtained by further evaporation of 6 l./hr. of water and crystallization at 20° C. This potassium chloride is employed in the production of potassium sulfate in the final stage of the process for reaction with the leonite recovered in the first and second stages of the process.

In stage III of the process, given in FIGURE II, 27 l./hr. of water are evaporated from the 134 l./hr. of mother liquor carried to stage III through line 2. It is then cooled in two steps. 6 kg./hr. of NaCl and 0.2 kg./hr. of KCl are crystallized upon cooling the solution to 50° C. By additionally cooling again to 25° C. 4 kg./hr. of KCl and 0.6 kg./hr. of NaCl are crystallized which are carried to the final $K_2SO_4$ recovery stage by line 3. The remaining 100 l./hr. of mother liquor is again heated and 43 l./hr. of water is evaporated at 70° C. resulting in the crystallization of 21 kg./hr. of kainite in addition to 5.6 kg./hr. of NaCl and 1.2 kg./hr. $MgCl_2$. This salt mixture is recycled into the starting step through line 1 and there introduced together with crude kainite as described.

In the final $K_2SO_4$ production stage given in FIGURE I the 4 kg/hr. of KCl deposited in stage III of the process and transferred by line 3 is dissolved in 90 l./hr. of water together with 15 kg./hr. KCl introduced from an external source. This solution together with the leonite deposited in the first and second stages of the process and 8 kg./hr. KCl from stage II of the process are placed in a mixing apparatus. The leonite is then converted to potassium sulfate. This is separated by, for example, recovering the $K_2SO_4$ crystals formed at about 30° C. The sulfate liquor, as already described, is recycled into stage II of the process where it forms the solvent together with the mother liquor from stage I.

Employing this process 38 kg./hr. of potassium sulfate is recovered corresponding to a yield of 98% based on the potassium introduced.

We claim:

1. In a multi-stage process for producing potassium sulfate from kainite containing a minor proportion of sodium chloride wherein potassium magnesium sulfate is produced in a first stage by dissolving kainite containing a minor proportion of sodium chloride in an aqueous medium and then crystallizing potassium magnesium sulfate, and wherein a second stage additional kainite containing a minor proportion of sodium chloride is dissolved with the mother liquor from said first stage and part of the sulfate solution from the potassium sulfate production stage and additional potassium magnesium sulfate and potassium chloride are produced by cooling in two crystallization steps and wherein the said potassium magnesium sulfate produced in the said first and second stages is converted to potassium sulfate by reacting it with potassium chloride, the improvements comprising in said second stage partially evaporating and cooling the solution to a temperature about 50° C. to precipitate essentially potassium magnesium sulfate, and then cooling the remaining solution to about 20° C. to precipitate essentially potassium chloride, and in the potassium sulfate production stage reacting the said potassium magnesium sulfate recovered from the first and second stages with the said potassium chloride recovered in the second stage mixed with additional potassium chloride from an external source outside the process to produce potassium sulfate which is recovered by crystallization.

2. In a multi-stage process set out in claim 1 the additional improvement comprising in a third stage partially evaporating the mother liquor from said second stage and then cooling to about 50° C., precipitating essentially sodium chloride, then cooling to about 25° C. to precipitate essentially potassium chloride, and supplying this potassium chloride to the potassium sulfate production stage.

3. In a multi-stage process set out in claim 1 the additional improvement comprising recycling almost all of the sulfate solution resulting from said potassium sulfate production stage and combining it with the mother liquor resulting from said first stage and employing this mixture of solutions as a solvent for the kainite of the said second stage.

4. In a multi-stage process as set out in claim 1 the additional improvement comprising employing kainite containing 10 to 25% sodium chloride as said kainite containing a minor proportion of sodium chloride.

5. In a continuous multi-stage process for production of potassium sulfate from kainite containing about 10 to 25% sodium chloride the steps comprising
    (a) producing potassium magnesium sulfate in a first stage by dissolving about 60 kilograms of said kainite containing 10 to 25% sodium chloride in about 83 liters per hour of water at about 95° C. and then crystallizing potassium magnesium sulfate by evaporating about 12 liters per hour of water and cooling the solution to about 20° C.
    (b) dissolving about 40 kilograms per hour of additional kainite containing about 10 to 25% sodium chloride in a second stage at about 95° C. with about 190 liters per hour of solution consisting essentially of mother liquor resulting from (a) and sulfate solution from a potassium sulfate production stage (e) and recycled water from (c),
    (c) evaporating about 27 liters per hour of water from the solution resulting from (b) and cooling to about 50° C. to precipitate essentially potassium magnesium sulfate,
    (d) evaporating about 6 liters per hour remaining solution from (c) and cooling to about 20° C. to precipitate essentially potassium chloride, and
    (e) mixing the potassium magnesium sulfate resulting from (a) and (c) with the potassium chloride resulting from (d) and about 15 kilograms per hour of potassium chloride from an external source outside the process in about 90 liters per hour of water at about 60° C. and recovering the resulting potassium sulfate.

6. A process as in claim 5 also comprising in a third stage
   (f) evaporating about 27 liters per hour of the solution resulting from (d) of claim 5 and cooling to about 50° C.
   (g) separating the essentially sodium chloride precipitate resulting from (f),
   (h) cooling the solution resulting from (g) to about 25° C.,
   (i) separating the essentially potassium chloride precipitate resulting from (h) and supplying this potassium chloride product to step (e) of claim 5.

7. A process as in claim 5 also comprising in a third stage
   (f) evaporating about 27 liters per hour of the solution resulting from (d) of claim 5 and cooling to about 50° C.,
   (g) separating the essentially sodium chloride precipitate resulting from (f),
   (h) cooling the solution resulting from (g) to about 25° C.,
   (i) separating the essentially potassium chloride precipitate resulting from (h) and supplying this potassium chloride product to step (e) of claim 5,
   (j) heating the solution resulting from (i) to about 70° C. and evaporating about 43 liters of water per hour therefrom,
   (k) separating the essentially kainite precipitate containing about 19% by weight sodium chloride and recycling this product to steps (a) and (b) of claim 5.

8. A process as in claim 1 wherein the process is carried out continuously.

References Cited by the Examiner
UNITED STATES PATENTS 3,058,806   10/1962   Ebner _____ 23—121

OSCAR R. VERTIZ, *Primary Examiner.*

MAURICE A. BRINDISI, *Examiner.*

E. C. THOMAS, *Assistant Examiner.*